US006895401B2

(12) United States Patent
Skinner et al.

(10) Patent No.: US 6,895,401 B2
(45) Date of Patent: May 17, 2005

(54) METHOD AND APPARATUS OF PERFORMING ACTIVE UPDATE NOTIFICATION

(75) Inventors: Brian Skinner, Mountain View, CA (US); Andy Kittridge Turk, Brooklyn, NY (US); Kevin McDonnell, Union City, CA (US); Vanessa McDonnell, Union City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 28 days.

(21) Appl. No.: 10/436,125

(22) Filed: May 13, 2003

(65) Prior Publication Data

US 2003/0204517 A1 Oct. 30, 2003

Related U.S. Application Data

(63) Continuation of application No. 09/092,356, filed on Jun. 5, 1998, now Pat. No. 6,721,740.
(60) Provisional application No. 60/087,130, filed on May 29, 1998.

(51) Int. Cl.$^7$ .............................................. G06F 17/00
(52) U.S. Cl. ...................... 707/1; 707/103 R; 707/103; 707/102
(58) Field of Search .......................... 707/1, 100–104.1, 707/10, 200–206; 709/200–203

(56) References Cited

U.S. PATENT DOCUMENTS

| 5,109,486 | A |   | 4/1992  | Seymour          |         |
|-----------|---|---|---------|------------------|---------|
| 5,560,022 | A |   | 9/1996  | Dunstan et al.   |         |
| 5,758,074 | A |   | 5/1998  | Marlin et al.    |         |
| 5,778,179 | A | * | 7/1998  | Kanai et al.     | 709/203 |
| 5,917,912 | A |   | 6/1999  | Ginter et al.    |         |
| 5,925,100 | A |   | 7/1999  | Drewry et al.    |         |
| 5,950,006 | A |   | 9/1999  | Crater et al.    |         |
| 5,983,351 | A |   | 11/1999 | Glogau           |         |
| 5,987,497 | A |   | 11/1999 | Allgeier         |         |

(Continued)

OTHER PUBLICATIONS

Pietzuch et al., Composite event detection as a generic middleware extension, Network, IEEE vol. 18, Issue 1, Jan.–Feb. 2004, pp. 44–55.*

(Continued)

*Primary Examiner*—David Jung
(74) *Attorney, Agent, or Firm*—Finnegan, Henderson, Farabow, Garrett & Dunner, L.L.P.

(57) ABSTRACT

A method and apparatus of performing active update notification. Components of an application are able to specify interest in a data object or set of data objects by registering an interest object with an update management component of the application. The interest object specifies the interested application component, as well as the identity of one or more data objects or an attribute value or range of values to associate with data objects. When modifications are made to data objects corresponding to the registered interest objects, the interested application component or components receive an update notification from the update management component. In one embodiment, active update notification is performed within a multi-tier application. An update management component exists at the application server on the application tier, as well as at each client in the client tier. In the application tier, the update management component maintains, with respect to clients and servers, a registry of interest objects of sufficient depth to determine which clients or other servers may be interested in changes to data objects. Update notifications are then sent only to the interested clients or servers. The interest registry of the update management component in the interested client is used to resolve the interested application component, and to forward the update notification appropriately.

60 Claims, 9 Drawing Sheets

U.S. PATENT DOCUMENTS

| | | | |
|---|---|---|---|
| 5,987,514 A | 11/1999 | Rangarajan | |
| 5,995,972 A | 11/1999 | Allgeier | |
| 6,021,437 A | 2/2000 | Chen et al. | |
| 6,044,381 A * | 3/2000 | Boothby et al. | 707/201 |
| 6,059,838 A | 5/2000 | Fraley et al. | |
| 6,173,327 B1 | 1/2001 | DeBorst et al. | |
| 6,243,716 B1 * | 6/2001 | Waldo et al. | 707/202 |
| 6,385,643 B1 * | 5/2002 | Jacobs et al. | 709/201 |

OTHER PUBLICATIONS

Marchetti et al., Enabling data quality notification in cooperative information systems through a Web-service based architecture, Web Information Systems Engineering, 2003, Proceedings of the Fourth International Conference on, Dec. 10–12, 2003, pp. 32.*

Busby et al., Enhancing NWS for use in an SNMP managed internetwork, Parallel and Distributed Processing Symposium, 2000, Proceedings, $14^{th}$ International, May 1–5, 2000,. pp. 506–511.* http://developer.java.sun.com/servlet./Pr . . . IArticles/Programming/KeepObjectsInSync/, by Jim Coker, Feb., 1997.

Sun Microsystems, 1997, "Java RMI Tutorial," Revision 1.3, JDK 1.1, FCS, Feb. 10, 1997.

Ho et al., "An extended CORBA event service with support for load balancing and fault-tolerance," Distributed Objects and Applications, 2000, Proceedings, DOA '00 International Symposium on, pp. 49–58.

Mouaddib et al., "A semi-structured object model with relations," Database Conference, 2000, ADC 2000, Proceedings $11^{th}$ Australasian, 1999, pp. 99–106.

Henning, "SPEC CPU2000: measuring CPU performance in the New Millennium," Computer, vol. 33, Issue 7, Jul. 2000, pp. 28–35.

* cited by examiner

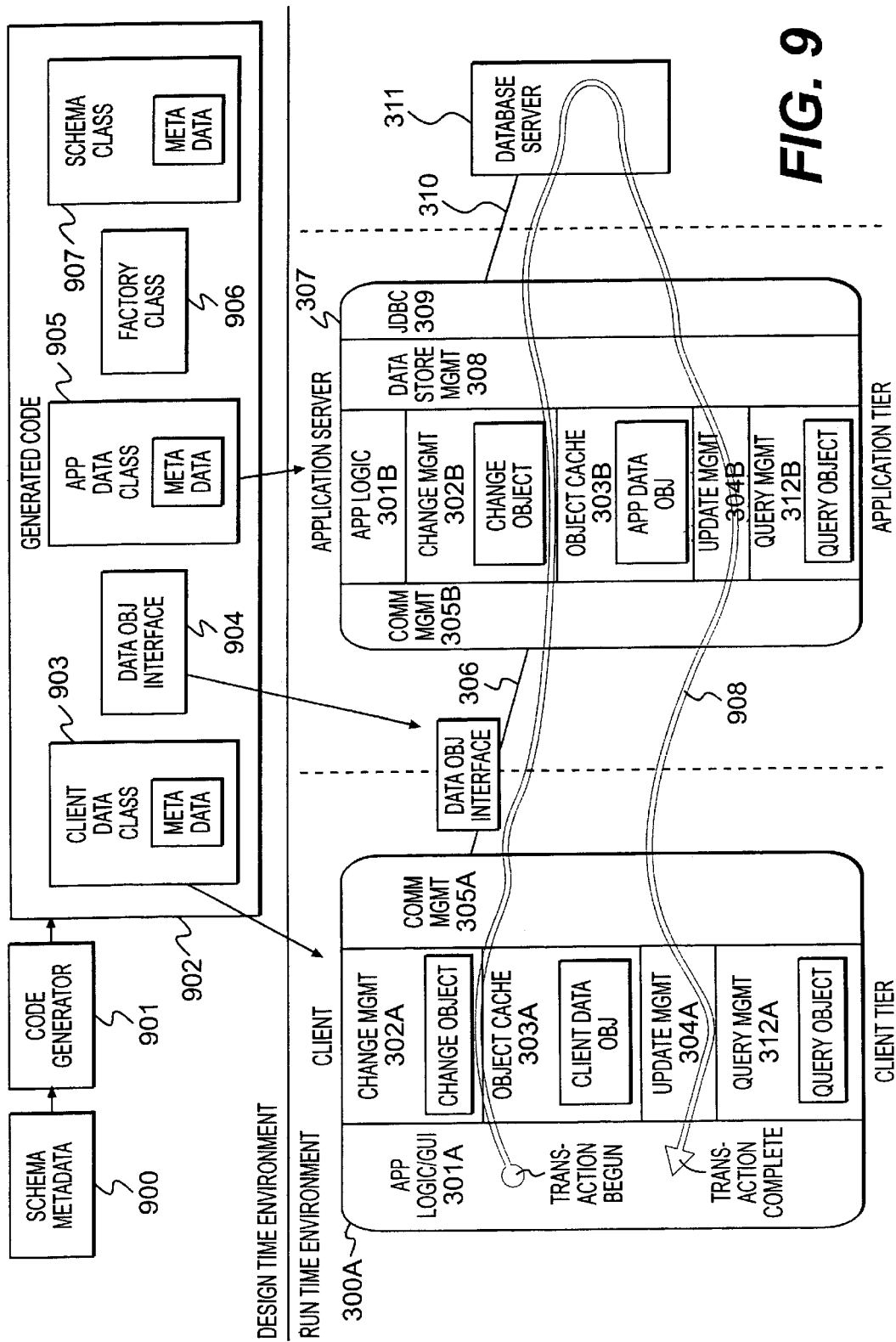

METHOD AND APPARATUS OF PERFORMING ACTIVE UPDATE NOTIFICATION

This is a continuation of application Ser. No. 09/092,356, filed Jun. 5, 1998, now U.S. Pat. No. 6,721,740, which claims the benefit of U.S. Provisional Application No. 60/087,130, filed May 29, 1998, and which is incorporated herein by reference.

BACKGROUND OF THE INVENTION

1. Field of the Invention

This invention relates to the field of computer software, and, more specifically, to object-oriented applications.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, SPARC, Java, JavaBeans and all Java-based trademarks and logos are trademarks or registered trademarks of Sun Microsystems, Inc. in the United States and other countries.

2. Background Art

In the computer industry, an application architecture that is becoming more widely used, particularly in the Internet environment, is the three-tier application architecture, or three-tier architecture. In this architecture, a client communicates requests to a server for data, software and services, for example, and the server responds to the requests which may entail communication with a database management system for the storage and retrieval of persistent data. The three tier architecture includes a database tier that includes a database server, an application tier that includes an application server and application logic (i.e., software application programs, functions, etc.), and a client tier. The application server responds to application requests (e.g., a request for a software applet, etc.) received from the client. The application server forwards data requests to the database server. An enterprise's application (e.g., a scheduling, accounting or personnel application) may involve all three tiers as data that is used by the application may be stored in a database.

Enterprise applications often consist of displaying data to a user and allowing the user to modify that data. In a multi-tier application, multiple users may each access the application and the enterprise data at the same time. It is desirable that each user be able to see the effects of his or her own modifications in near real time. It is also desirable that the effects of other users' modifications, as well as those modifications performed by the application itself (e.g., time-based changes), be made evident to each user in near real time. For this to happen, many disparate components of the application, across multiple tiers, need to know when data changes. However, typically, an application component is unaware of data changes until the application component next performs a data access, at which time the application component might determine what changes have been made since the last data access operation. There is no mechanism for achieving near real time notification of changes across multiple tiers.

An overview of a multi-tier architecture is described below with reference to FIG. 2. In the three-tier architecture illustrated in FIG. 2, client tier 202 typically consists of a computer system that provides a graphic user interface (GUI) generated by a client 206, such as a browser or other user interface application. Client 206 generates a display from, for example, a specification of GUI elements (e.g., a file containing input, form, and text elements defined using the Hypertext Markup Language (HTML)) and/or from an applet (i.e., a program such as a program written using the Java™ programming language that runs when it is loaded by the browser).

Further application functionality is provided by application logic managed by application server 210 in application tier 216. The apportionment of application functionality between client tier 202 and application tier 216 is dependent upon whether a "thin client" or "thick client" topology is desired. Database tier 218 contains the data that is accessed by the application logic in application tier 216. Database server 212 manages the data, its structure and the operations that can be performed on the data and/or its structure.

Application server 210 can include applications such as a corporation's scheduling, accounting, personnel and payroll applications, for example. Application server 210 manages requests for the applications that are stored therein. Application server 210 can also manage the storage and dissemination of production versions of enterprise application logic (i.e., the versions that are currently being used by the corporate users). Database server 212 manages the database (s) that manage data for applications. Database server 212 responds to requests to access the scheduling, accounting, personnel and payroll applications' data, for example.

Connection 204 is used to transmit enterprise data between client tier 202 and application tier 216, and may also be used to transfer the enterprise application logic to client tier 202. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. Connection 214 between application server 210 and database server 212 represents the transmission of requests for data and the responses to such requests from applications that reside in application server 210.

Elements of the client tier, application tier and database tier (e.g., client 206, application server 210 and database server 212) may execute within a single computer. However, in a typical system, elements of the client tier, application tier and database tier may execute within separate computers interconnected over a network such as a LAN (local area network) or WAN (wide area network).

SUMMARY OF THE INVENTION

A method and apparatus of performing active update notification is described. Components of an application are able to specify interest in a data object or set of data objects by registering an interest object with an update management component of the application. The interest object specifies the interested application component, as well as the identity of one or more data objects or an attribute value or range of values to associate with data objects. When modifications are made to data objects corresponding to the registered interest objects, the interested application component or components receive an update notification from the update management component.

In one embodiment, active update notification is performed within a multi-tier application. An update management component exists at the application server on the application tier, as well as at each client in the client tier. In the application tier, the update management component maintains, with respect to clients and servers, a registry of interest objects of sufficient depth to determine which clients or other servers may be interested in changes to data objects. Update notifications are then sent only to the interested clients or servers. The interest registry of the update management component in the interested client is used to resolve the interested application component, and to forward the update notification appropriately.

Interest objects are provided that allow interests to be registered for individual data objects or sets of data objects. Interests may be further refined by registering other interest objects as sub-interests of existing interest objects to build an interest hierarchy within the registry. Interested components, also referred to as "observers," may be registered for each interest object in the hierarchy to receive notification of updates. A further interest object collects data objects that are part of a changed set, either through addition, removal or update, to allow an interested component to access those collected data objects after receipt of an update notification.

BRIEF DESCRIPTION OF THE DRAWINGS

FIG. 9 is a block diagram of design time and run time environments for a three-tier system incorporating an embodiment of the invention.

DETAILED DESCRIPTION OF THE INVENTION

The invention is a method and apparatus of performing active update notification. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Though also applicable to stand-alone client applications, in one embodiment of the invention, the apparatus for performing active update notification is embodied in one or more components of a multi-tier application implemented as computer software that is executed by a computer apparatus. A description is given below of an embodiment of a computer apparatus suitable for providing an execution environment for the software apparatus of the invention.

Embodiment of Computer Execution Environment (Hardware)

Figure 1:
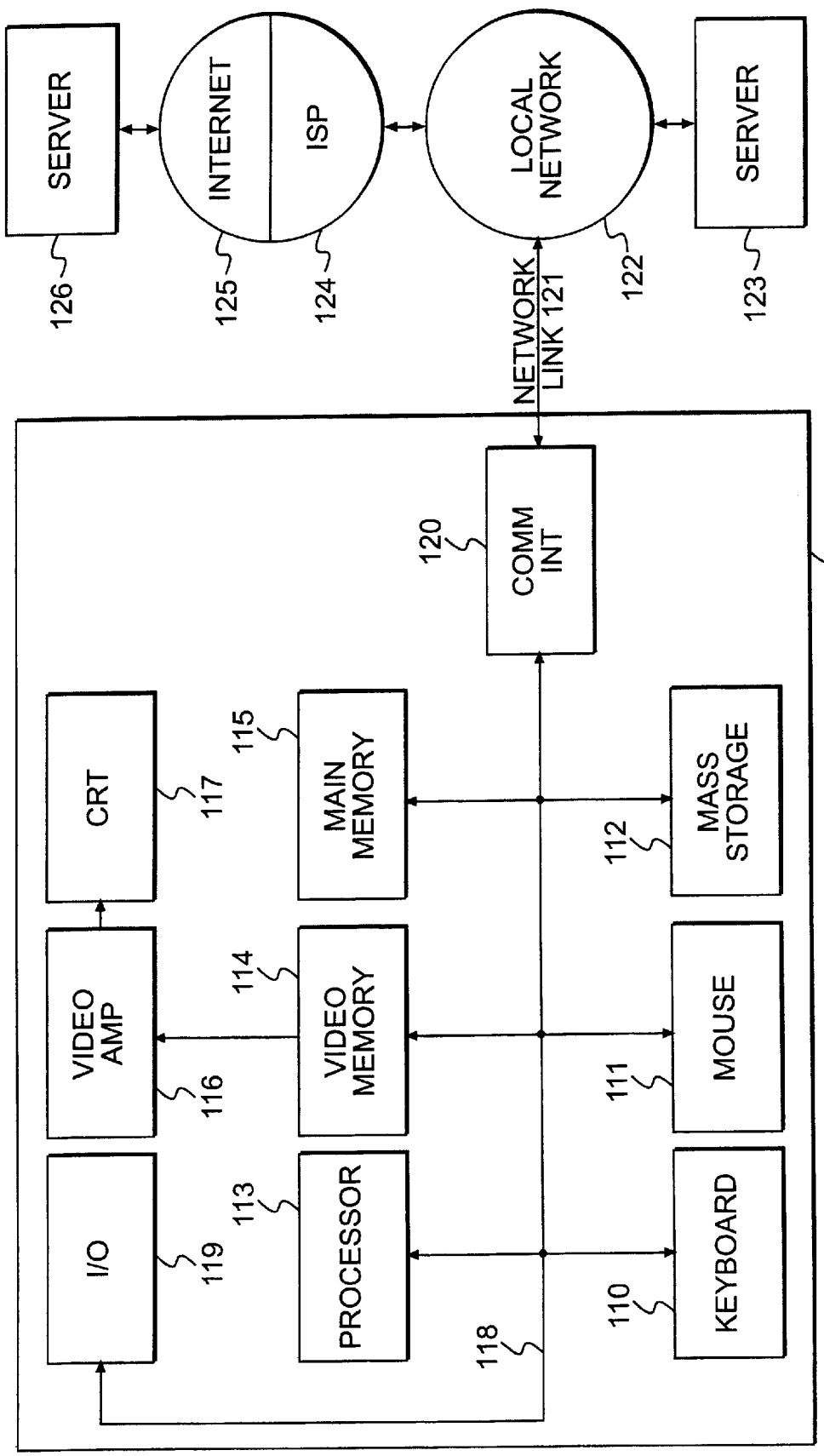
FIG. 1 is a block diagram of one embodiment of a computer system capable of providing a suitable execution environment for an embodiment of the invention.
Figure 2:
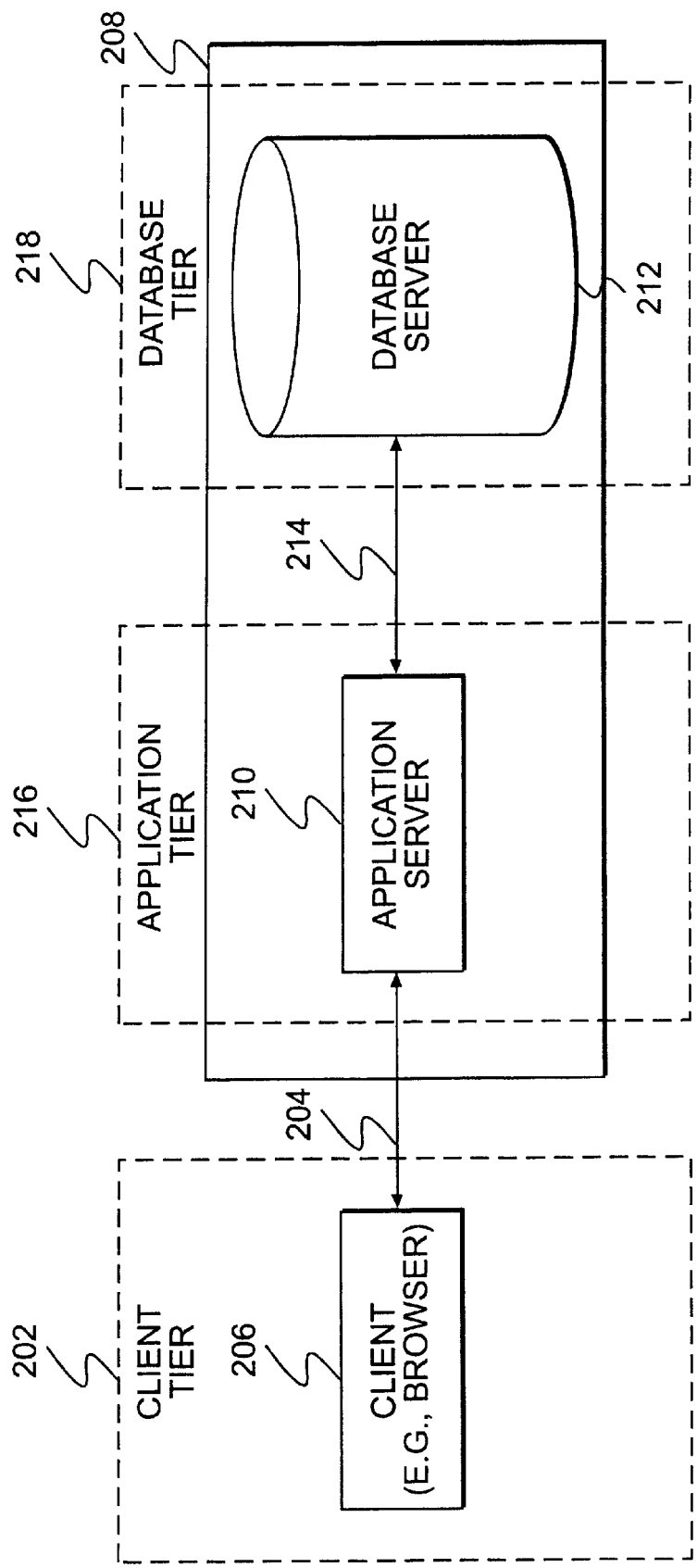
FIG. 2 is a general block diagram of a three-tier system.

An embodiment of the invention can be implemented as computer software in the form of computer readable code executed on a general purpose computer such as computer 100 illustrated in FIG. 1, or in the form of bytecode class files executable within a Java runtime environment running on such a computer. A keyboard 110 and mouse 111 are coupled to a bi-directional directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680×0 processor or a microprocessor manufactured by Intel, such as the 80×86, or Pentium processor, or a SPARC™ microprocessor from Sun Microsystems, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such downloaded application is the apparatus for performing active update notification described herein.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

General Software Apparatus

An embodiment of the invention includes software apparatus comprising a collection of components forming a multi-tier application. The components may be implemented as one or more instances of object classes in accordance with known object-oriented programming practices, or the components may be implemented under one or more component model definitions. Several component model definitions are currently available, such as COM, CORBA, and the Java component scheme referred to as JavaBeans™.

Each component model provides for encapsulation of related functions and data structures into individual components, similar to what occurs under a standard object-oriented programming (OOP) approach. The particular mechanisms by which the components are managed and interact are defined according to the respective component model. Bridges (e.g., ActiveX) may be constructed which allow components designed under different component model definitions to interact within a single application. Interaction is typically performed through a set of methods implemented by the component. These sets of methods are referred to as "interfaces" in some component models. The public methods by which OOP object classes interact are often presented in the form of application programming interface (API) definitions.

To provide a better understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set-salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set-salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. The parent class is also referred to as a "superclass." Each subclass in the hierarchy may add to or modify the behavior specified by its parent class. Some object-oriented programming languages support multiple inheritance where a subclass may inherit a class definition from more than one parent class. Other programming languages, such as the Java programming language, support only single inheritance, where a subclass is limited to inheriting the class definition of only one parent class. The Java programming language also provides a mechanism known as an "interface" which comprises a set of constant and abstract method declarations. An object class can implement the abstract methods defined in an interface.

An object is a generic term that is used in the object-oriented programming environment to refer to a module that contains related code and variables. A software application can be written using an object-oriented programming language whereby the program's functionality is implemented using objects. As previously discussed, the encapsulation provided by objects in an object-oriented programming environment may be extended to the notion of components under a component model definition.

Implementation in the Java Programming Language

An embodiment of the software apparatus of the invention is implemented in the Java programming language. The Java programming language is an object-oriented programming language with each program comprising one or more object classes. Unlike many programming languages, in which a program is compiled into machine-dependent, executable program code, Java classes are compiled into machine independent bytecode class files. Each class contains code and data in a platform-independent format called the class file format. The computer system acting as the execution vehicle supports the Java runtime environment; The runtime environment contains a program called a virtual machine, which is responsible for executing the code in Java classes.

Applications may be designed as standalone Java applications, or as Java "applets" which are identified by an applet tag in an HTML document, and loaded by a browser application. The class files associated with an application or applet may be stored on the local computing system, or on a server accessible over a network. Each class is loaded into the Java runtime environment, as needed, by the "class loader."

Java classes are loaded on demand from the network (stored on a server), or from a local file system, when first referenced during an application or applet's execution. The runtime environment locates and loads each class file, parses the class file format, allocates memory for the class's various components, and links the class with other already loaded classes. This process makes the code in the class readily executable by the virtual machine.

Java classes may also be incorporated into Java components referred to as "JavaBeans". JavaBeans are designed in accordance with the JavaBean API Specification to allow for component-based application building. Bridges (e.g., ActiveX bridges) may be used with JavaBeans to allow JavaBeans to be used in other component model environments, such as OLE/COM and CORBA.

Support for features such as "introspection," "customization," "events," "properties" and "persistence" is provided within the JavaBean framework to facilitate application building and component use. "Introspection" permits builder tools to analyze how a particular bean works. "Customization" permits an application builder to customize the appearance and behavior of a bean. "Events" provide a simple communication metaphor that can be used to connect a bean with other application components or beans. "Properties" are used for bean customization and programmatic use. "Persistence" allows for a bean to have its customized state saved and reloaded later. These features are discussed in the JavaBean API Specification, Version 1.01, by Sun Microsystems (1997), which is available on the World Wide Web at the URL, "http://java.sun.com/beans/spec.html", and is incorporated herein by reference.

Embodiments of the software apparatus may be implemented using standard OOP object classes or using components under a known component model definition. For the purposes of the following description, references to components may refer to one or more instances of OOP object classes, or one or more components under a known component model.

Active Update Notification and Interest Objects

An embodiment of the invention provides a mechanism for components of an application to specify an interest in one or more data objects. Once this interest is specified, the application component is notified whenever the data objects associated with the specified interest undergo modification, for example, through creation, deletion or alteration. This notification is provided at the time the modification is made, for example, as a final step in a transaction to apply the modification to the associated data (e.g., to persistent data stored in a database).

Interests are represented as interest objects in an interest registry within an update management component. When a change is made to a data object, the root node of the interest registry is notified. The interest registry is traversed to determine those application components that have registered interest objects specifying interest criteria that matches the changed data object. Notification of the change is sent to those application components whose interest criteria matches the changed data object.

Notification may be performed by an update management component working in association with a change management component to detect when changes are made. Further, the update management component may utilize a query scheme for the specification of some or all registered interests. For example, a query object may specify criteria for data objects that an application component wishes to access. By implementing the query object as an interest object, or by transforming the query criteria into an interest object, interests associated with a query can be registered as part of a query operation.

As a further benefit to application performance, interests registered with an update management component may be used by an object cache for efficient "pruning" of the cache. This means that the object cache may more efficiently serve its associated application components by, for example, maintaining those data objects for which an interest is registered, and deleting those objects for which no interest exists.

In accordance with an embodiment of the invention, interest can be expressed for a single data object or for a set of data objects. Interest for a single data object may be expressed explicitly, such as by specifying a unique identifier of the data object such as an object ID or serial number. Interest for a set of data objects may be expressed either explicitly with a set of unique object identifiers, or the interest may be expressed in terms of interest criteria. Each data object comprises one or more data attributes (or variables), and may further contain one or more metadata attributes. Metadata attributes comprise data or descriptions about a data object or the attributes the data object contains. Interest criteria may include a specific value or range of values for one or more attributes of a data object. To evaluate whether a data object meets the interest criteria, the criteria is tested against attributes of the data object.

Mechanisms are also provided for refining the set of data objects specified in a given interest object or for providing a new interest that is the union of two or more existing interests. Interest refinement may be performed by specifying further interest criteria, for example, by registering a refinement object under an existing interest object, or by registering another interest object as a sub-interest of an existing interest object. A union of interests may be provided by registering existing interest objects under a new union interest object. Also, a collected update mechanism is provided for collecting data objects associated with updates of a transaction to allow registered observers to access those data objects after receiving an update notification.

Figure 4:
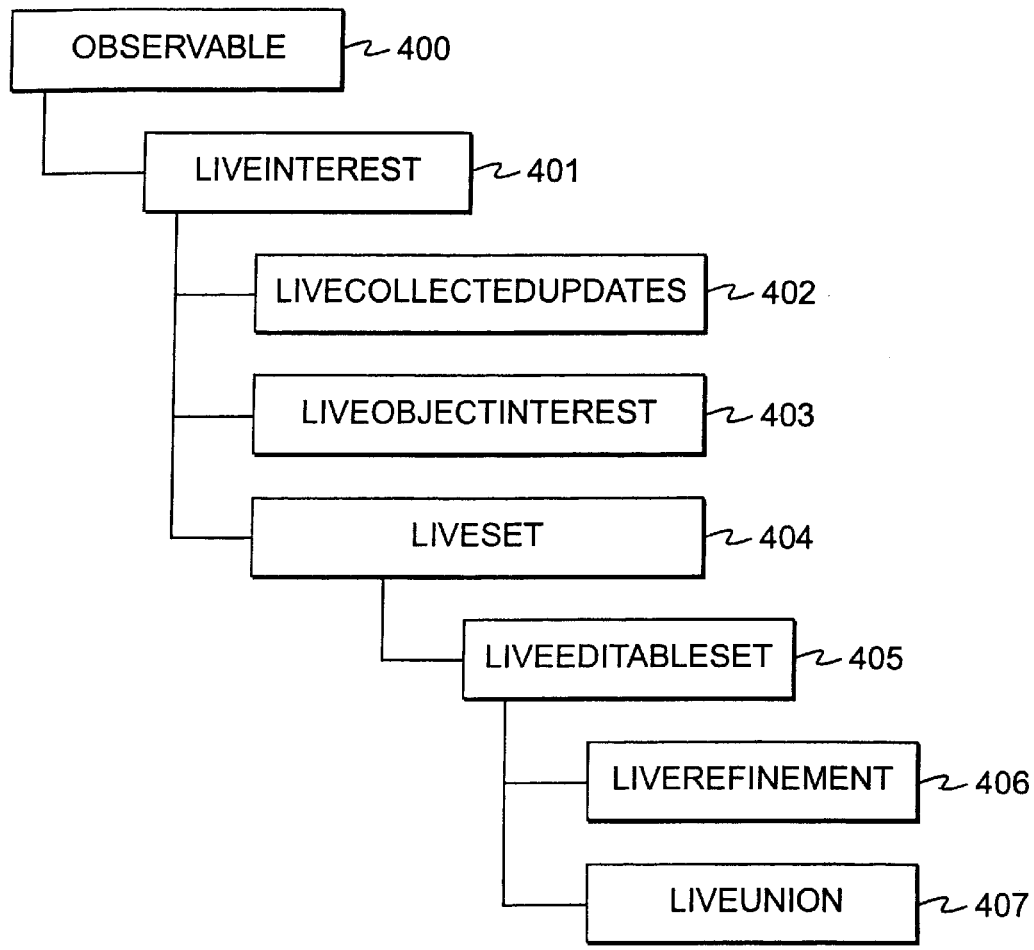
FIG. 4 is a block diagram of an interest class hierarchy in accordance with an embodiment of the invention.

FIG. 4 illustrates a class hierarchy of interest objects in accordance with an embodiment of the invention. Subclasses in the hierarchy inherit all variables and methods of their respective superclass (unless overridden). The subclasses can then extend their respective superclass by defining further variables and methods.

The first class of the hierarchy is Observable 400, which is an element of the Java.util standard class library. Observable 400 provides methods for adding observers to and deleting observers from an observer list, methods for notifying observers on the observer list that a change has occurred, and methods for setting and clearing a flag that specifies whether a change has occurred. Notification is performed by calling an update( ) method on all observers. An update notification may include a reference back to the sender of the notification, i.e., the calling interest object.

LiveInterest 401 is a subclass of Observable 400. LiveInterest 401 is configured to receive notification of a change to a data object, with a reference to the changed data object passed as a parameter. Methods to support general interest functions, such as comparison of a data object with interest criteria and registration of sub-interests, are also implemented.

LiveCollectedUpdates 402, LiveObjectInterest 403 and LiveSet 404 are subclasses of LiveInterest 401. LiveCollectedUpdates 402 is configured to collect data objects associated with changes made during a transaction, effectively caching those changes. The data objects are collected, for example, in one of several Vectors (e.g., an "added" Vector, a "removed" Vector, and an "updated" Vector) based on whether the data object was added to a set of data objects defined by the given interest, removed from the set of objects, or updated. A registered observer of a LiveCollectedUpdates instance receives, at the end of a transaction, an update notification that includes a reference to the LiveCollectedUpdates instance. Using the reference, a registered observer may query the LiveCollectedUpdates instance to retrieve the "added", "removed" and "updated" data object Vectors. Based on the data objects contained in the those Vectors, the registered observer can ascertain the changes made to the set of data objects defined by the interest.

LiveObjectInterest 403 is configured to support an interest in a single object, for example, by specifying an object ID. In one embodiment, when an instance of LiveObjectInterest 403 is notified of a changed data object, the object ID of the changed object is compared with the object ID specified in the LiveObjectInterest instance, and all registered observers are notified if there is a match. LiveSet 404 is configured to support an interest in a set of objects. As stated above, a set of objects may be explicitly specified, such as by a set of object IDs, or by specifying attribute values or ranges for data objects to include in the set. LiveEditableSet 405 extends LiveSet 404 to support changes to the specified set.

LiveRefinement 406 and LiveUnion 407 are subclasses of LiveEditableSet 405. LiveRefinement 406 is configured to be appended to an instance of LiveSet 404 to further refine a given set. For example, if an instance of LiveSet 404 specifies a set of appointments for the current month, an instance of LiveRefinement 406 might specify appointments for UserX. For the LiveRefinement instance, the interest set would be those appointments for the current month that are associated with UserX. Registered observers of the LiveRefinement instance would receive notifications relevant to that refined set. The refinement is specified in one embodiment within a shouldContain( ) method of LiveRefinement 406. The data object is sent as a parameter to an instance of LiveRefinement 406, and shouldContain( ) returns a boolean value indicating whether the data object should be contained in the set (i.e., indicating that the data object satisfies the designated refinement).

LiveUnion 407 is configured to support update notification in the event that a changed data object meets the criteria of one or more interest objects associated with an instance of LiveUnion 407. LiveUnion 407 is used by obtaining multiple interest objects of any sort and registering them with an update management component in an interest registry. The instance of LiveUnion 407 is then registered as a sub-interest of each of the multiple interest objects.

In accordance with an embodiment of the invention, for a multi-tier application, update notifications are filtered at each tier by an interest registry. Update notifications traverse the interest registry, and are evaluated against the interest criteria of each interest object. Where the interest criteria are not met, the update notification is halted in its traverse of the given branch of the registry and discarded. Where the interest criteria is satisfied, the update notification is passed on to the next interest object(s) in the given branch (e.g., those interest objects registered as sub-interests of the current interest object). Where application components are registered as observers of an interest object, satisfaction of the interest criteria results in transmission of an update notification to the registered application components at the time the transaction completes.

Figure 5A:
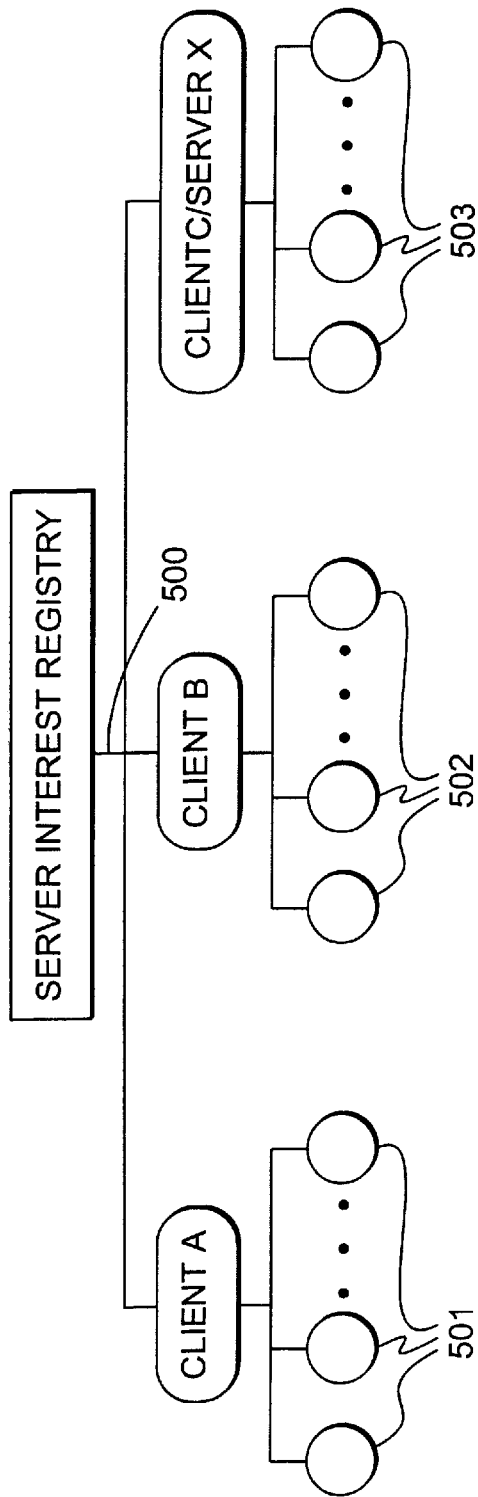
FIGS. 5A and 5B are block diagrams of example interest registries for a server and a client, respectively, in accordance with an embodiment of the invention.
Figure 5B:
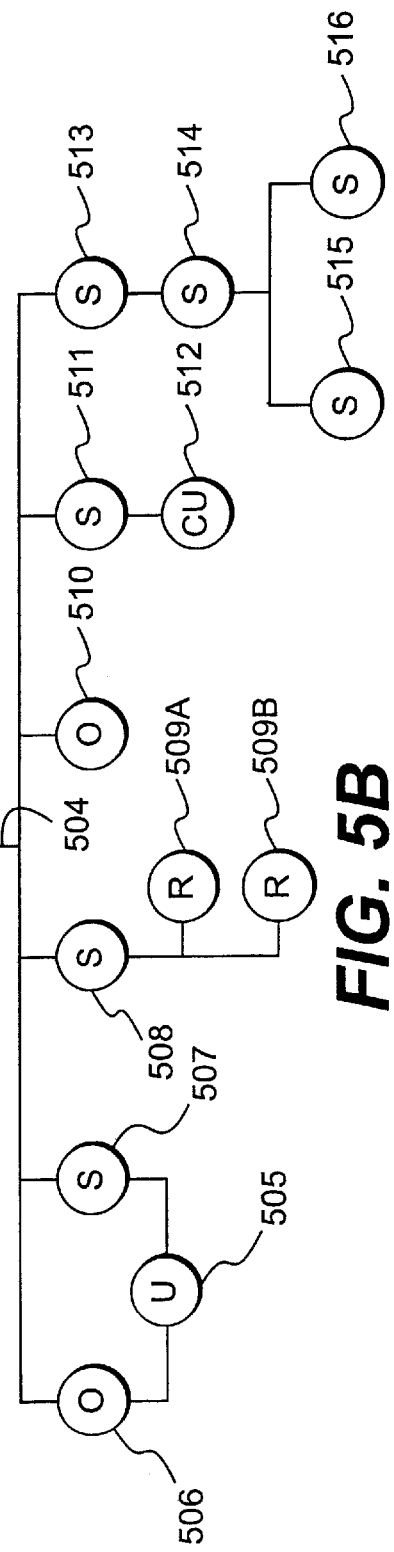

FIGS. 5A and 5B illustrate interest registries for an application server and a client, respectively. In each case, the interest registry is managed by an update management component. Whereas the interest registry for the client resolves update notifications for specific application components, the interest registry for the server need only resolve update notifications to the level of the individual clients.

FIG. 5A comprises root node 500, which is coupled to a Client A interest object, a Client B interest object and a Client C/Server X interest object. The Client C/Server X interest object refers to an interest object registered with root node 500 for a third client ("Client C") or another application server ("Server X"). The respective client or server, or a component acting on behalf of the client or server, is registered as an observer of the respective interest object. A group of interest objects 501 are registered under the Client A interest object; a group of interest objects 502 are registered under the Client B interest object, and a group of interest objects 503 are registered under the Client C/Server X interest object. Interest objects for components within the subject application server (i.e., the server containing the present server interest registry) may register with root node 500, and extend via sub-interests. However, interest objects for components of the subject application server are not shown in FIG. 5A for clarity.

Root node 500 forwards update notifications to interest objects that register with it. Root node 500 may be, for example, a general interest object to which other interest objects may register as sub-interests. The interest criteria for the root node encompasses all data objects so that all notifications are passed to registered sub-interests.

The interest objects registered underneath client interest objects in the server interest registry (e.g., 501–503) are typically the same as, or similar to, the first level of interest objects registered in the respective client interest registry (e.g., interest objects 506–508, 510–511 and 513 of FIG. 5B). Further levels of interest objects, such as those represented by refinement objects and other sub-interests, are typically not represented in the server interest registry to reduce the processing requirements of the application server.

A tradeoff exists between the efficiency of sending update notifications to only those clients who are interested in a given data object, and the efficiency of resolving multiple levels of interest objects.

When a data object is changed at the application server, root node 500 of the server interest registry is notified of the change, and the changed data object is specified in the notification. The notification is passed to each interest object registered to root node 500 as a sub-interest (e.g., the Client A interest object, the Client B interest object, the Client C/Server X interest object, etc.). Each client interest object passes the notification to each of its respective registered sub-interests (e.g., 501, 502 or 503). Each of those interest objects then tests the changed data object against its respective interest criteria. If the interest criteria are met for any given interest object, the "changed" flag for the given interest object is set.

In the server interest registry, the setting of a "changed" flag in any one of the interest objects in groups 501–503 result in the setting of the "changed" flag for the respective client interest object. For example, if one or more interest objects in group 501 set their respective "changed" flags, the Client A interest object is triggered to set its own "changed" flag. Each client interest object, that has its "changed" flag set at the time the transaction is completed at the server, delivers an update notification to the component registered as an observer on behalf of the respective client. That component then queries the client interest object to obtain the list of changed data objects, and transmits those changed data objects to the client. The root node of the respective client interest registry within the respective client's update management component is then notified of the change.

FIG. 5B illustrates an example client interest registry having root node 504. Registered to root node 504 in FIG. 5B are LiveObjectInterest (O) object 506, LiveSet (S) object 507, LiveSet object 508, LiveObjectInterest object 510 and LiveSet object 511 and LiveSet object 513. Registered to LiveObjectInterest object 506 and LiveSet object 507 as a sub-interest is LiveUnion (U) object 505. Registered as sub-interests of LiveSet object 508 are LiveRefinement objects 509A and 509B. Registered as a sub-interest of LiveSet object 511 is LiveCollectedUpdates (CU) object 512. Registered as a sub-interest of LiveSet object 513 is LiveSet object 514, and registered as sub-interests of LiveSet object 514 are LiveSet objects 515 and 516.

When root node 504 is notified of an object change, the notification is sent to objects 506, 507, 508, 510, 511 and 513. If, at any level of the registry, the changed data object does not match the respective interest criteria of a given interest object, the interest object disregards the notification and does not pass the notification on to any underlying interest objects (i.e., sub-interests). However, if the changed data object does match the respective interest criteria of a given interest object, the "changed" flag of the given interest object is set and the notification is passed to any registered sub-interests. Update notifications are sent, at the time the transaction completes, to all registered observers of those interest objects for which the "changed" flag is set.

LiveUnion object 505 represents the union of the interest criteria of both LiveObjectInterest object 506 and LiveSet object 507. LiveUnion object 505 sets its own "changed" flag if an update notification is received from either of LiveObjectInterest object 506 or LiveSet object 507.

LiveSet object 508 tests the changed data object against its own interest criteria. If there is a match, the 'changed" flag is set for LiveSet object 508, and the shouldContain( ) methods of each of LiveRefinement objects 509A and 509B are called to test the changed data object against the respective refinement interest criteria. If, for either of LiveRefinement objects 509A and 509B, the shouldContain( ) method returns "true", indicating that the respective refinement criteria is satisfied, the "changed" flag is also set for the respective refinement object.

LiveObjectInterest object 510 determines whether the changed data object matches the data object specified in its own interest criteria (e.g., object ID), and sets its "changed" flag if there is a match.

LiveSet object 511 determines whether the changed data object meets its respective interest criteria, and, if the determination is positive, sets its own "changed" flag and passes the update notification to LiveCollectedUpdates object 512. LiveCollectedUpdates object 512 determines whether the changed data object matches its own interest criteria, if any is specified. If a match is indicated (or no criteria is specified), the changed data object is placed into an "added" Vector, a "removed" Vector, or an "updated" Vector based on whether the associated change was to add the data object to, or remove the data object from, the object set defined by the interest criteria, or whether the change was to update the data object. The "changed" flag of LiveCollectedUpdates object 512 is then set. Any update notification sent to observers registered to LiveCollectedUpdates object 512 will include a reference to object 512 to permit the observer to query object 512 for the contents of the "added", "removed" and "updated" Vectors.

LiveSet objects 513–516 illustrate a successive refinement of an interest set by the registration of a chain of sub-interests. At each node in the chain (i.e., at each interest object), the effective interest criteria of the chain may be refined by the criteria specified for the given node.

Any interest object may be registered as a sub-interest of another interest object. Also, any interest object in an interest registry may have its own registered observers. Reasons for registering sub-interests include, for example, refinement of an existing interest, and notification of changes to a related interest based on changes to the parent interest.

Figure 6:
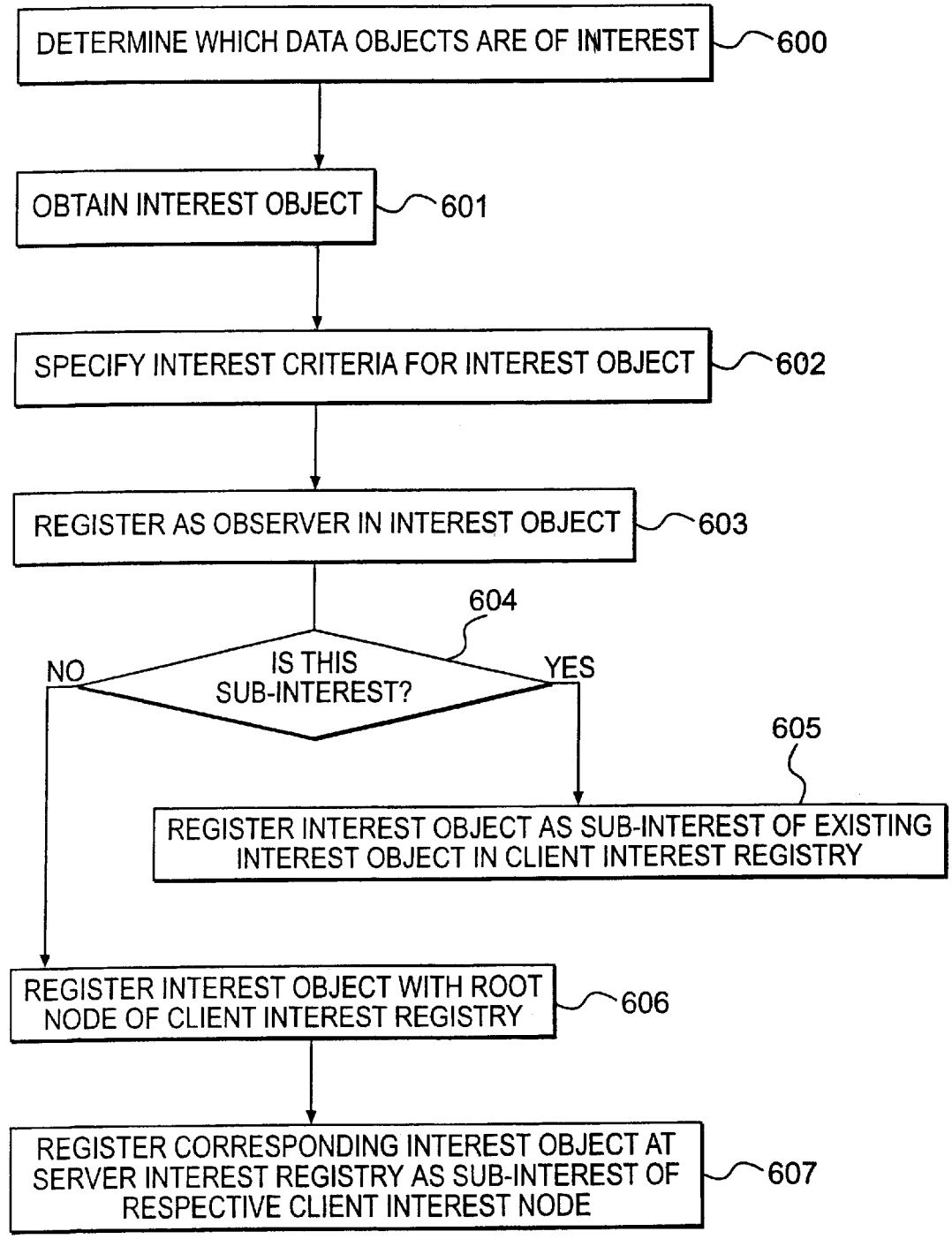
FIG. 6 is a flow diagram of a process for registering an interest in accordance with an embodiment of the invention.

FIG. 6 is a flow diagram illustrating a process for registering an interest in accordance with an embodiment of the invention. This process may be performed when an application component develops an interest in activities associated with a data object, or the process may be performed in combination with the development of an application query (e.g., query object). In step 600, an application component determines the data objects for which it is interested in receiving update notifications. In step 601, an instance of an interest object (e.g., LiveObjectInterest, LiveCollectedUpdates, LiveSet, LiveUnion, etc.) is obtained, and the interest criteria is specified for the interest object in step 602. Preset interest subclasses with precoded criteria may also be utilized. In step 603, the interested application component is registered as an observer of the interest object.

In step 604, if the current interest is being developed as a sub-interest of an existing interest object, the process continues at step 605, where the current interest object is registered as a sub-interest of the existing interest object in the client interest registry. If, in step 604, the current interest is not being developed as a sub-interest of an existing interest object, the process continues at step 606. In step 606, the interest object is registered with the root node of the client interest registry as part of the top tier of the registry. In step 607, a corresponding interest object is registered at the server interest registry as a sub-interest of the client interest node of the current client.

Figure 7:
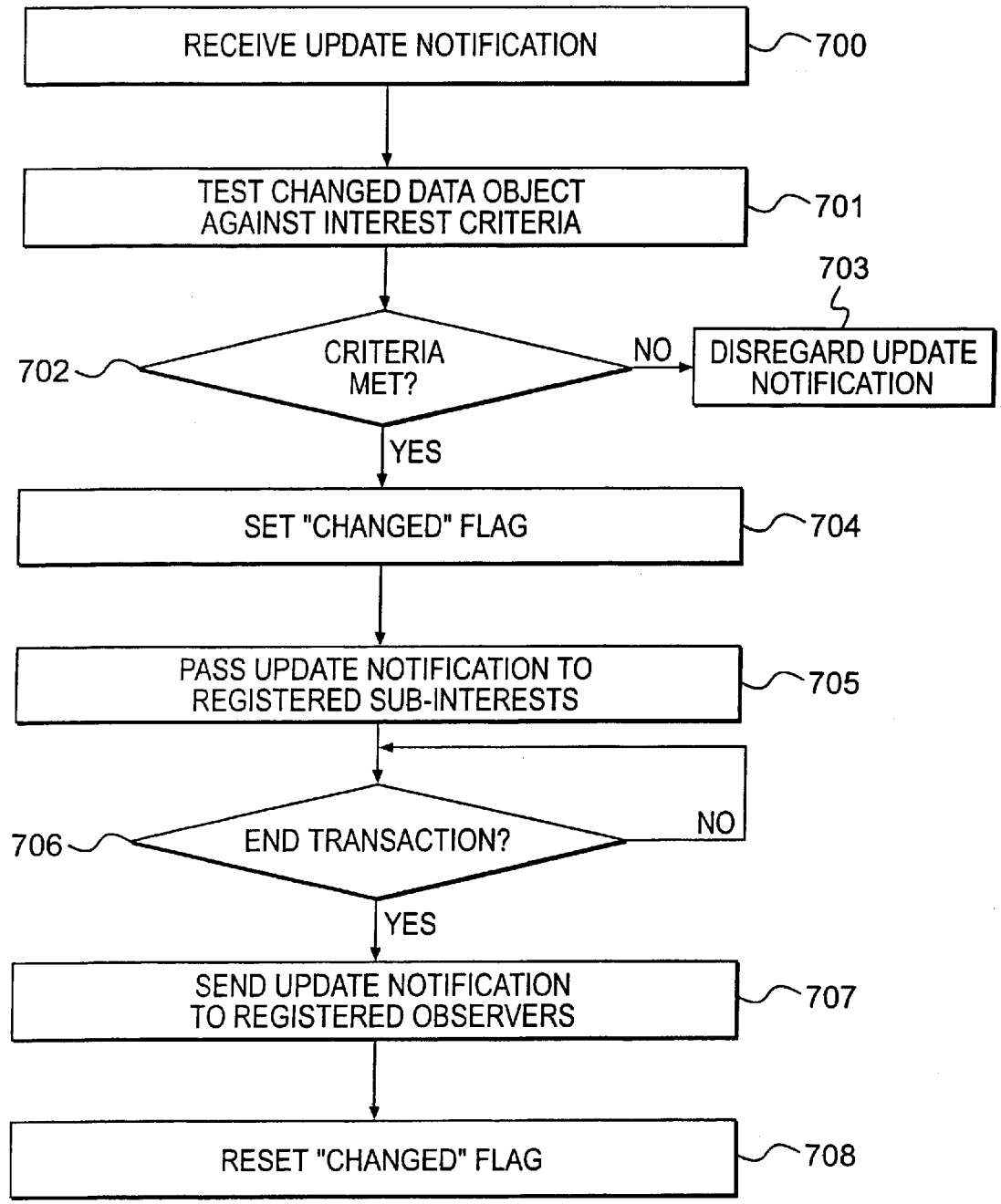
FIG. 7 is a flow diagram of a process for handling update notifications within an interest object in accordance with an embodiment of the invention.

FIG. 7 is a flow diagram of a process for handling receipt of an update notification within an interest object in accordance with an embodiment of the invention. In step 700, the update notification is received, for example, from the root node of an interest registry or from another interest object. In step 701, the changed data object is tested against the interest criteria specified for the current interest object. This test may entail, for example, a comparison of attribute values, or a determination of whether an attribute value falls within a specified range. If, in step 702, the interest criteria are not met (i.e., the test failed), the update notification is disregarded and the process stops at step 703. If, in step 702, the interest criteria are met, the process continues at step 704.

In step 704, the "changed" flag for the current interest object is set, and, in step 705, the update notification is passed to any registered sub-interests. In step 706, the process waits for the end of the current transaction before proceeding to step 707. In step 707, an update notification is sent to all components that are registered as observers for the current interest object. The "changed" flag is then reset in step 708.

Implementation Within Three-Tier Architecture

An embodiment of the invention is executed within a multi-tier application architecture having system management components that handle the representation of data in the form of data objects on the client tier and application or server tier. Application-specific logic on the client tier and application tier access the data objects in the same manner, with storage and retrieval of persistent information in the database occurring transparently to the application specific logic.

An object cache is provided on the client tier and the application tier to return pointers to data objects in response to object IDs. Application queries are performed via query objects. A query object is resolved against the object cache if the query object contains only object IDs. Otherwise, the query object is converted into a database query. The results of a database query are packaged into one or more data objects and returned.

Changes to data are handled via change objects that encapsulate the changes being made. Change objects are produced automatically by data objects, and propagated transparently from the originating tier to the database tier in a transaction-based scheme by change management components in the client and application tiers. As change objects propagate through the client and application tiers, the change objects may be applied to the corresponding data objects in the object caches. Updates of changes are propagated to interested components via update management components on the client and application tiers that implement an embodiment of the active update notification methods of the invention. Change objects and query objects are transmitted between the client and application tiers by communication management components using serialization and reflection techniques.

Figure 3:
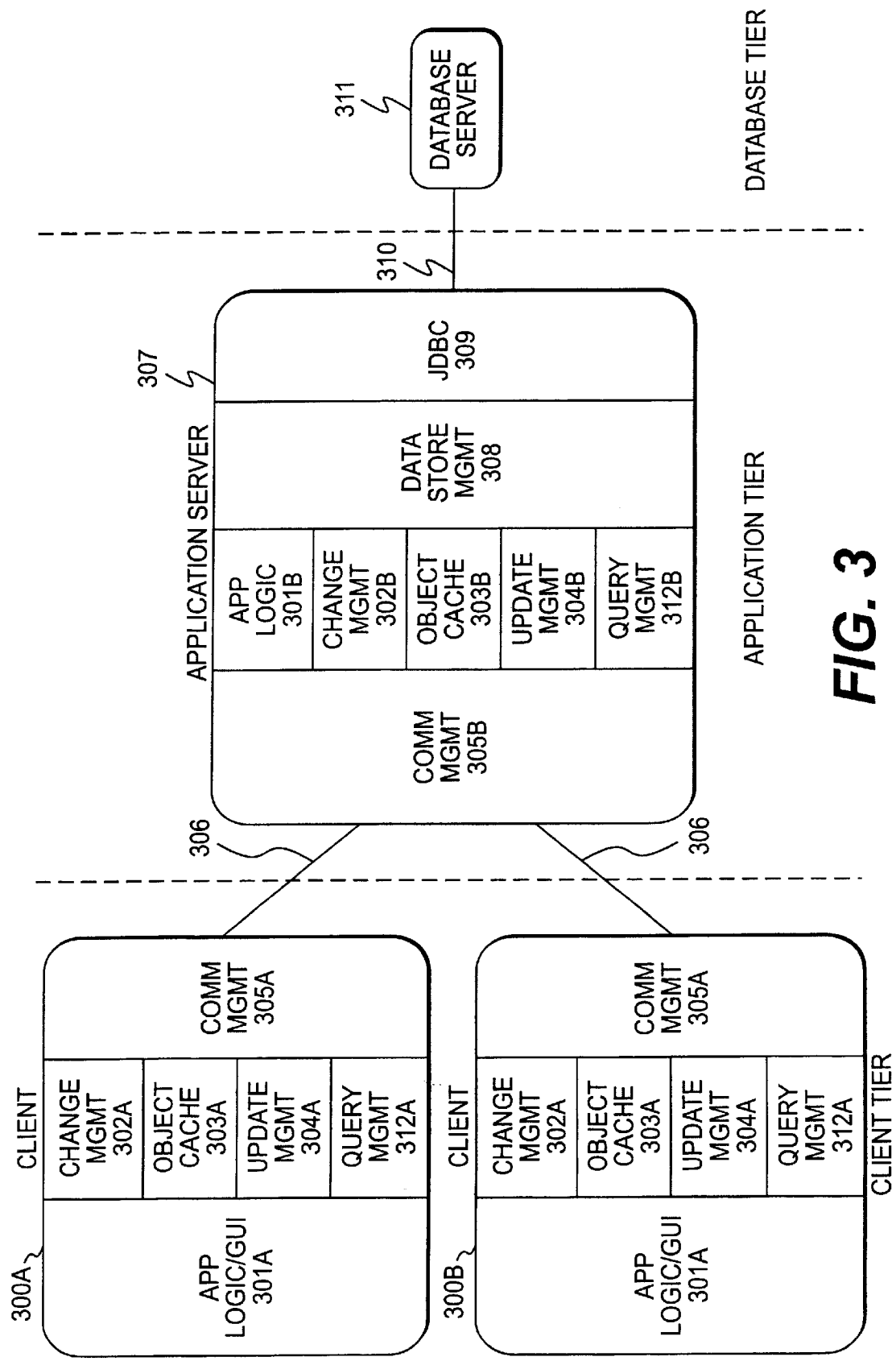
FIG. 3 is a block diagram of a three-tier application framework in accordance with an embodiment of the invention.

FIG. 3 is a block diagram of an implementation of a three-tier application architecture implementing an embodiment of the invention. The three-tier application framework comprises one or more clients, such as clients 300A and 300B, in the client tier, application server 307 in the application tier and database server 311 in the database tier. As represented by lines 306, clients 300A and 300B are coupled to application server 307 to exchange method calls and data. As represented by line 310, application server 307 is coupled to database server 311 to exchange database calls and data. It is also possible in some embodiments for additional servers to be coupled to application server 307 for the exchange of enterprise data.

Within the client and application tiers, data is maintained in the form of data objects. Application server 307 maintains a set of objects containing data for the clients it serves. Clients 300A and 300B each maintain a subset of objects containing data for their respective user needs. Application server 307 is responsible for transforming data from the format of database server 311 into the form of data objects, and, similarly, from the form of data objects into the format of database server 311. Additionally, queries are transformed from a general query object format into the particular query format expected by database server 311, such as SQL.

Clients 300A and 300B comprise client-side application logic and graphic user interface (GUI) component 301A, client-side change management component 302A, client-side object cache component 303A, client-side update management component 304A, client-side communication management component 305A and client-side query management component 312A. Application server 307 comprises server-side communication management component 305B, server-side application logic 301B, server-side change management component 302B, server-side object cache component 303B, server-side update management component 304B, server-side query management component 312B, data store component 308 and database connectivity component 309 (e.g., a Java data base connectivity or JDBC™ component).

Client-Side Components

Client-side application logic and GUI component 301A provides the software mechanism by which the user is able to view the data and other output associated with a particular application, to generate input in the form of additions, deletions and modifications of data, and to otherwise exert control over the data and format of what is displayed. Client-side application logic and GUI component 301A interfaces with client-side change management component 302A, client-side object cache component 303A, client-side update management component 304A and client-side query management component 312A.

Client-side change management component 302A provides the software mechanism by which changes to data are handled within the respective client. This entails determining which objects within the client are affected by a change and carrying out the change on those objects. Also, the change is propagated to the application server for handling. In one embodiment, changes are abstracted into change objects. The change object, for example, may contain the state of a given data object before a change is applied, as well as the state of the given data object after the change is applied. Custom change objects for specific data classes may be subclassed from general framework change object superclasses. Client-side communication management component 305A is used to transmit a change object to application server 307, or to receive a change object from application server 307.

Client-side object cache component 303A maintains a set of objects for the respective client, as well as a hash table of the unique ID of each object thus maintained and an associated pointer to that object. When a user makes a request for data via client-side application logic and GUI component 301A, client-side object cache component 303A is first queried to determine whether the data object containing the desired data is already resident at the client. If the data object is resident, as indicated by the presence of its object ID in the hash table, client-side object cache component 303A returns to the requesting logic a pointer to the data object. If the object is not resident at the client, client-side cache component 303A sends a request for the given object to application server 307. When the desired object is transmitted from application server 307 to the requesting client, a pointer to the object is returned to the requesting application logic, and the object is registered in the hash table for future requests.

To maintain control over the number of data objects resident in the client, client-side object cache component 303A may perform what is referred to as "pruning the cache." This means that certain data objects are removed from client-side object cache component 303A by removing their entries in the hash table. Data objects whose entries have been removed from the hash table may then be garbage collected by the system. In accordance with one embodiment of the invention, the manner in which pruning is performed is based on which data objects are currently represented by interest objects in the registry maintained by the update management component 304A.

Within update management component 304A, interest objects are used as previously described to indicate that one or more components are "interested" in actions involving a particular data object or set of data objects. These interest objects can thus be used to determine which cache objects are subject to registered interest and which are not. Those cache objects for which no interest objects are registered may be removed from the hash table and garbage collected to achieve more efficient cache performance.

Client-side query management component 312A provides a mechanism for formulating application queries, and, either resolving those queries against client-side object cache component 303A, or forwarding those queries to application server 307 for handling. Object requests or queries from application logic are typically encapsulated within one or more query objects. If a query object contains only object IDs, the query object may be resolved against the object cache. If a query object contains query information other than object IDs, the query object is transmitted to application server 307 to be resolved into an appropriate database query for the database server. Responses to the database query are encapsulated into one or more data objects and returned to the requester. The hash tables of the respective object cache components are updated to include the new data objects.

Custom query objects with application specific semantics may be subclassed from general framework query object superclasses. Further, query object subclasses may extend interest-based object superclasses that implement active update notification through registration of interest objects that identify the query requester with the data objects resulting from the query.

Client-side update management 304A provides the software mechanism by which updates are applied to data objects and other associated objects within the respective client. Client-side update management component 304A implements an active update notification scheme in accordance with an embodiment of the invention. This means that not only is a data object affected by changes in the form of an addition, deletion or modification of associated data, those objects in client-side application logic and GUI component 301A that are dependent on the associated data are also updated. This is opposed to a passive update scheme wherein objects in client-side application logic and GUI component 301A are not aware of changes to data until and unless a further reference is made to the respective data object, at which time the data object determines whether an update is necessary.

Client-side communication management component 305A provides the software mechanism by which objects and method calls are transmitted between the client (300A or 300B) and application server 307. In accordance with an embodiment of the invention, objects that may be transmitted between the client and application tiers are configured with metadata describing the elements of the object, such as the attribute names and types, methods, etc. Objects configured with metadata can be serialized, that is, broken down into a set of data bytes containing the metadata descriptions and object state which may later be reconstituted (i.e., "deserialized") by the same or a different application to generate a copy of the original object.

Serialization provides a useful mechanism for object persistence and transmission. With respect to persistence, a serialized object may be stored in memory for any length of time and regenerated with the same state the object had at the time it was serialized. With respect to object transmission, a serialized object may be transmitted between remote clients and servers as data streams or packets in accordance with known communication protocols, such as the protocol implemented by the Remote Method Invocator (RMI) API. Also, serialized objects may be written to a shared portion of memory by one application and read out of the shared memory by another application. Client-side and server-side communication management components 305A and 305B implement methods to perform serialization and deserialization functions. Data transport, such as the transmission and reception of serialized objects, may be implemented using any known communication protocol as described above.

Server-Side Components

Server-side communication management component 305B performs the same general functions for application server 307 as its counterpart component 305A does for client 300A or 300B, such as serialization, deserialization, and data transport. Method calls and objects received by the server-side communication management component from client-side communication management component 305A are directed to server-side components 301B, 302B, 303B and 304B and 312B as specified by the call either explicitly or implicitly. Method calls or objects destined for the client tier are directed to the client-side communication management component 305A of the specified client, 300A or 300B.

Server-side application logic 301B provides any application-specific functions for application server 307, such as data analysis and processing algorithms, etc. Further, automated data functions, such as time-based operations, and multi-client oriented operations may be implemented by server-side application logic 301B. These functions may also include the implementation of a permissions model for determining access permissions and change permissions for different clients or users. The division of application-specific functionality between client-side application logic and GUI component 301A and server-side application logic 301B may be determined by the relative efficiency of shared functions on a server versus local functions on a client. Also, the use of a thin client or thick client topology may determine how functions are divided between clients 300A and 300B and application server 307.

Server-side change management component 302B provides for the application of changes, for example, in the form of change objects, to data objects in application server 307. Change objects may be received from either of clients 300A or 300B (or from other servers). The changes embedded within change objects are used by datastore management component 308 to send appropriate calls to database server 311 to manipulate the persistent data stored therein. In one embodiment, as part of a change operation, a call may be made to one or more permissions objects in the application logic component 301B, to determine whether the encapsulated change is allowed. The change may then be undone at the client if the change is not permissible, or the change may be carried out on the application server and propagated to the database if the change is permissible.

In one embodiment, changes are handled within a transactional scheme. Change objects allow several benefits in a transactional scheme. For example, change objects may be stored on a stack after the associated changes have been performed. The stack of change objects may then be used to perform transaction rollbacks, that is, the change objects may be used to "undo" or reverse the changes previously performed. "Redo" functions are also easily implemented. In one embodiment, change objects may be collected on a client while the client is offline from an application server. When the client is once again connected to the application server, the change objects may be applied to the application server.

Server-side object cache component 303B is similar to the client-side object cache component 303A. When a data object request or query object is received from a client or from the server-side application logic 301B, the request is resolved against the cache, if possible, by specifying the object ID in the hash table. If a data object is already registered with the object cache component 303B, a pointer to that object is returned. If the object is not registered with object cache component 303B, datastore management component 308 is utilized to obtain the desired object or objects from the persistent store of database server 311. The newly obtained data object is registered with object cache component 303B, and the pointer to the data object is returned to the query sender.

Server-side update management component 304B acts in association with change management component 302B to ensure that update notifications are transmitted to all interested elements of the system. Under the active update notification scheme using interest objects, update management component 304B maintains a registry of clients and other servers that wish to be notified when a designated data object is changed. When a change is made, interested elements within application server 307 and interested clients receive notification of the change. Notification within each client is typically resolved by the respective client-side update management component 304A.

Server-side query management component 312B receives query objects from the client tier, from other application servers, or from components of application server 307. Query objects thus obtained are resolved against server-side object cache 303B if only object IDs are specified by the query. If the query object cannot be resolved against object cache component 303B, either because the requested object IDs are not in the hash table, or because the query is not in the form of object IDs, query management component 312B passes the query object to datastore management component 308 to be processed.

Datastore management component 308 responds to calls from the server-side change management component 302B by making API calls to JDBC component 309 to create, delete or mutate persistent data within database server 311. Datastore management component also responds to query objects by submitting database requests to the database server. The results of the database requests are then encapsulated into one or more corresponding data objects. If a data object resulting from a query is already in the server-side object cache component 303B, the cached data object is returned. If the data object is not in server-side object cache component 303B, a new data object is obtained, via factory method calls directed to a data class factory object, to encapsulate the data. Typically, the factory method calls result in the instantiation of a desired data object class. However, in other embodiments, the new data object may be obtained from a pool of available data object instances. The new data objects are assigned ID numbers, loaded with appropriate data from database server 311, and returned.

Datastore management component 308 performs the conversion from queries encapsulated in query objects to corresponding database calls by resolving the queries with database tables. The JDBC component 309 provides the conversion between general database calls made by datastore management component 308 and database-specific commands (e.g., SQL) and communication protocol required by the particular implementation of database server 311 (e.g., Oracle, Sybase, etc.). Connection 310 represents the communication link between JDBC component 309 and database server 311. In some embodiments, other database connectivity components may be used in place of or in addition to JDBC component 309.

Database server 311 may be any form of structured persistent store. For example, database server 311 may comprise a flat-file data management system, a relational database management system (RDBMS), an object-oriented database management system (ODBMS), etc. The datastore management component 308 handles mapping of the data objects to the database.

Figure 8:
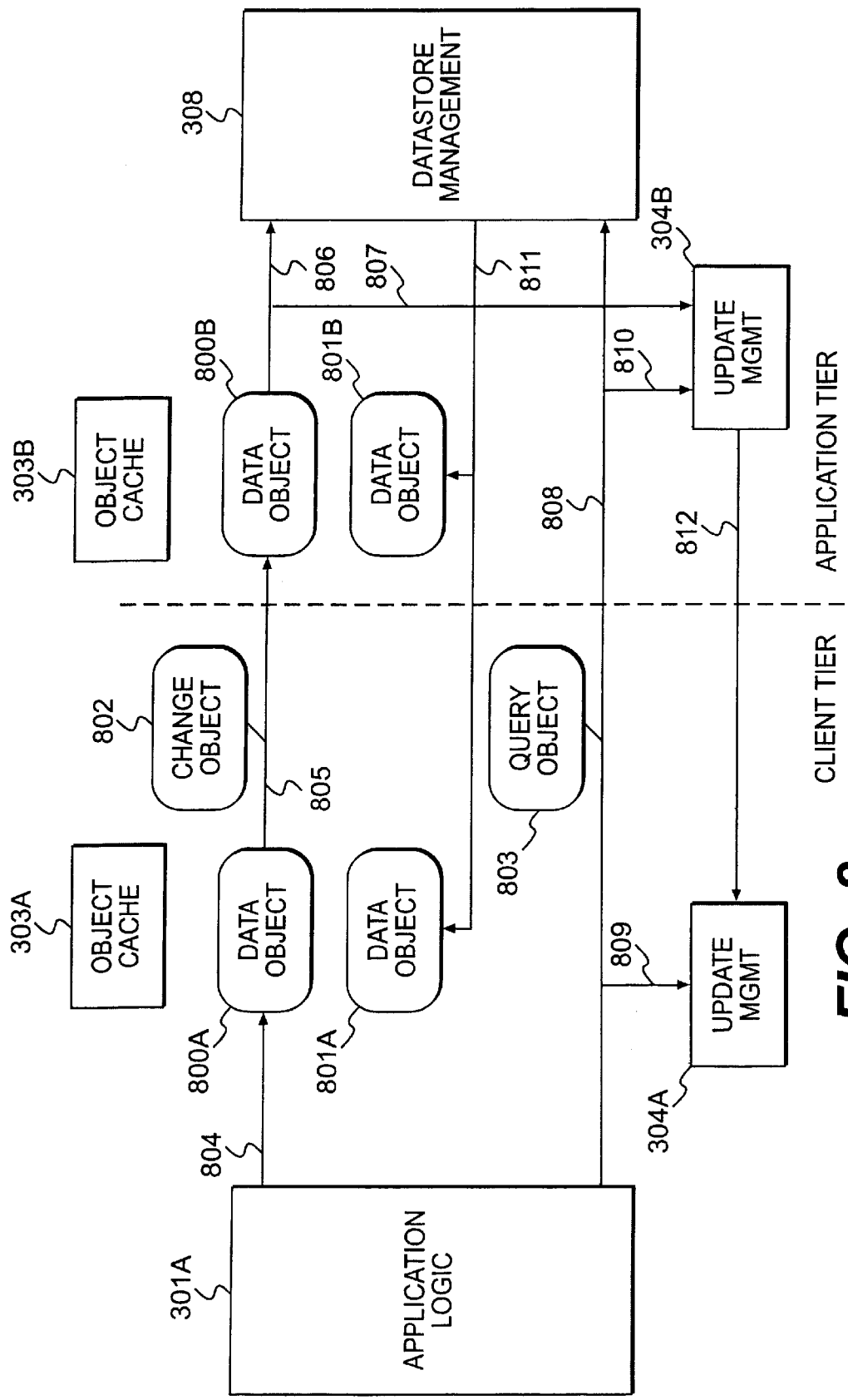
FIG. 8 is a block diagram illustrating the use of data objects, change objects and query objects, in accordance with an embodiment of the invention.

FIG. 8 illustrates the use of data objects, change objects and query objects in the client and application tiers in accordance with one embodiment of the invention. The client tier comprises application logic 301A, object cache 303A, and update management component 304A. The application tier comprises object cache 303B, datastore management component 308 and update management component 304B. In addition, data objects 800A and 800B reside in object cache 303A and object cache 303B, respectively.

When application logic makes a change to data object 800A, as indicated by arrow 804, a transaction is initiated that includes the creation of a change object and the propagation of that change object to the database. Change object 802 is transmitted to the application tier, as indicated by arrow 805, where change object 802 is applied to corresponding data object 800B. Changed data object 808 is then applied to the database through datastore management component 308, as indicated by arrow 806.

As one of the steps in the change transaction, update management component 304B is informed of the change, as indicated by arrow 807. Interested clients are identified by update management component 304B, and a notice of the change is transmitted to the update management component 304A of the interested clients, as indicated by arrow 812. The client update management component 304A then determines, based on its interest registry, which elements on the client should receive notification of the change. The data objects in object cache component 303A are typically updated at the time the client is notified of the change.

When application logic 301A makes a database query that cannot be resolved directly by an object cache, the query is transmitted, as shown by arrow 808, to datastore management component 308 in the form of query object 803. Transmission of query object 803 is performed under management of client-side and server-side query management components (not shown). In response to the query, datastore management component 308 returns, as shown by arrow 811, corresponding data objects 801A and 801B which are registered with the client-side object cache 303A and server-side object cache 303B, respectively. As part of the query process, interest in data objects 801A and 801B is registered with update management components 304A and 304B, as shown by arrows 809 and 810, respectively.

FIG. 9 illustrates relationships between the design time and run time environments of a multi-tier application incorporating an embodiment of the invention. The design time environment is associated with the generation of class definitions for one or more data classes, a factory class and a schema class, based on application-specific schema metadata. The run time environment is associated with the execution of the three-tier application (as illustrated in FIGS. 3 and 8) in which instances of the classes generated in the design time environment are integrated with the components of the three-tier application. For example, data objects in the run time environment are created as instances of the data classes generated in the design time environment. An instance of the generated factory class is used in the run time environment to obtain the data object instances. Also, an instance of the generated schema class is used in the run time environment to structure the database at initial start-up, and to provide a facility for accessing schema metadata at run time.

As shown, the design time environment comprises schema metadata 900, code generator 901, and generated code 902. Generated code 902 further comprises client data class 903, data object interface 904, application (i.e., server) data class 905, factory class 906 and schema class 907. For one implementation of the multi-tier application, one client data class 903, one data object interface 904 and one application data class 905 are generated for each data class described by schema metadata 900. Data classes 903 and 905 include metadata describing the attributes and methods, for example, of the respective class. Schema class 907 includes metadata describing the data management of the system in terms of metaclasses and their constituent elements.

The run time environment comprises the components of the client, application and database tiers as earlier described with respect to FIG. 3. For example, the client tier comprises one or more clients (300A) having application logic and GUI component 301A, change management component 302A, object cache component 303A, update management component 304A, query management component 312A and communication management component 305A. The application tier comprises one or more application servers (307) having communication management component 305B, application logic 301B, change management component 302B, object cache component 303B, update management component 304B, query management component 312B, datastore management component 308 and JDBC component 309. The database tier comprises one or more database servers (311). The client and application tiers are joined by connection 306, and the application and database tiers are joined by connection 310.

As shown, handling of change objects, such as change application and forwarding operations, is performed by change management components 302A and 302B at the client and server tiers. Query management components 312A and 312B at the client and server tiers handle query object operations, such as resolving queries against a respective object cache or forwarding to another tier or to the data store component for handling. Object cache components 303A and 303B manage data objects for client 300A and application server 307, respectively. As suggested above, the client data objects are obtained for object cache component 303A in the form of instances of client data classes 903 generated in the design time environment. Similarly, application data objects in object cache component 303B are obtained in the form of instances of application data classes 905. Corresponding data objects in the client and application tiers implement the same shared data object interface 904 generated in the design time environment.

In FIG. 9, arrow 908 is used to illustrate the propagation of a change transaction through the three-tier system. The transaction begins in application logic and GUI component 301A, when the application logic initiates a change to a data object, for example, by calling one of the data object's attribute "set" accessor methods. In response to the method call, the data object calls change management component 302A, where a corresponding change object is obtained. Change management component 302A adds the change object to a list of change objects associated with a single transaction. Other change objects may be added to the list before the transaction is closed, for example, due to receipt of an "end of transaction" call.

When the transaction is closed, change management component 302A provides the list of change objects to communication management component 305A. Communication management component 305A serializes and transmits the list of change objects to communication management component 305B at application server 307. Communication management component 305B deserializes the list of change objects and provides them to change management component 302B. Change management component 302B then applies the list of change objects to the application data objects in object cache component 303B. The updated data objects in object cache component 303B are passed to data store management component 308. Datastore management component 308, in association with JDBC component 309, converts the updated data objects into database calls (e.g., SQL calls) to database server 311 to update the database records corresponding to the updated data objects.

If the transaction fails at the database server, change management component 302B uses the list of change objects to "undo" the changes made to the data objects in object cache component 303B and sends notification to client 300A that the transaction failed to commit. If the datastore management component 308 receives confirmation of a successful update from the database server, update management component 304B is notified of the updated data objects in object cache component 303B. Update management component 304B notifies all interested components on application server 307, and sends update notifications to all other interested servers and interested clients.

The update notification to the client includes the updated data objects. Communication management component 305B serializes the data objects and transmits them to communication management component 305A. Communication management component 305A extracts the object IDs from the serial stream and determines whether those data objects exist in object cache 303A. If a data object already exists, the values of the data object are updated with the values of the corresponding serialized data object. If a data object does not exist in the object cache, a new data object instance is placed in object cache component 303A and loaded with the values of the corresponding serialized data object.

Once updated data objects have been established in object cache component 303A, update management component 304A is notified of the updated data objects in the object cache. Update management component 304A proceeds to notify all interested components of client 300A of the updated data objects. The transaction is completed when the initiating element of application logic and GUI component 301A receives notification of the changed data objects.

In another implementation, the change objects may be applied to the data objects in object cache component 303A at the time an "end of transaction" is signaled. In this case, object cache component 303A would not need updating just prior to notifying update management component 304A of the updated data objects. However, any "undo" operation would include undoing data object changes in object cache component 303A.

Thus, a method and apparatus of performing active update notification has been described in conjunction with one or more specific embodiments. The invention is defined by the claims and their full scope of equivalents.

What is claimed is:

1. In a computer system, a method comprising:
   registering with an update management component that resides within a first client of a plurality of clients an interest in at least one data object, said interest referring to an interested component;
   registering, in connection with said first client, said interest with a second update management component residing within an application server; and
   in response to a change in said at least one data object, sending a notification to said first client.

2. The method of claim 1, wherein said step of registering said interest comprises the step of specifying interest criteria.

3. The method of claim 1, wherein said step of registering said interest comprises registering an interest object with an interest registry.

4. The method of claim 3, further comprising traversing said interest registry to identify said interested component.

5. The method of claim 3, further comprising the step of refining said interest by associating a refinement object with said interest object.

6. A computer-readable medium containing instructions for controlling a data processing system to perform a method comprising:
   registering with an update management component that resides within a first client of a plurality of clients an interest in at least one data object, said interest referring to an interested component;
   registering, in connection with said first client, said interest with a second update management component residing within an application server; and
   in response to a change in said at least one data object, sending a notification to said first client.

7. The computer-readable medium of claim 6, wherein the step of registering the interest includes specifying interest criteria.

8. The computer-readable medium of claim 6, wherein the step of registering the interest comprises registering an interest object with an interest registry.

9. The computer-readable medium of claim 8, wherein the method further includes traversing the interest registry to identify the interested component.

10. The computer-readable medium of claim 8, wherein the method further comprises refining the interest by associating a refinement object with the interest object.

11. A method comprising:
    receiving, from an interested component, a request for registering an interest in at least one data object including interest criteria associated with the at least one data object;
    determining a change in the at least one data object; and
    providing a notification of the change to the interested component and at least one other interested component that registered an interest in the at least one data object.

12. The method of claim 11, wherein determining a change in the at least one data object comprises:
    receiving a request to change the at least one data object from the interested component; and
    changing the at least one data object based on the change request.

13. The method of claim 12, wherein receiving a request to change the at least one data object comprises:
    receiving a change object created by the interested component.

14. The method of claim 11, wherein the interest criteria reflects predetermined data values associated with data attributes of the at least one data object.

15. The method of claim 11, wherein the request for registering an interest in at least one data object includes an identifier associated with the at least one data object specified by the interested component.

16. The method of claim 11, wherein determining a change in the at least one data object further comprises:
    determining whether the changed at least one data object meets the interest criteria.

17. The method of claim 16, wherein providing comprises:
    providing a notification of the change to the interested component and the at least one other interested component that registered an interest in the at least one data object based on a determination that the changed at least one data object meets the interest criteria.

18. The method of claim 11, wherein receiving, from an interested component, a request for registering an interest in at least one data object further comprises:
    creating an interest object associated with the at least one data object and the interested component.

19. The method of claim 18, wherein determining a change in the at least one data object further comprises:
    notifying the interest object of the change.

20. The method of claim 19, wherein notifying the interest object further comprises:
    notifying a sub-interest object registered to the interest object of the change.

21. The method of claim 18, wherein the interest object supports a union of interest criteria associated with each of a plurality of other interest objects that are associated with the at least one data object and the interested component.

22. The method of claim 21, wherein determining a change in the at least one data object further comprises:
    notifying the interest object when a notification of a change to the at least one data object is received by at least one of the plurality of other interest objects.

23. A method performed by an interested component, comprising:
    providing, to a local computational entity, a request for registering an interest in at least one data object; and
    receiving, from the local computational entity, a notification of a change to the at least one data object based on a notification of the change from a remote computation entity associated with the at least one data object.

24. The method of claim 23, wherein the request specifies an interest criteria associated with the at least one data object.

25. The method of claim 23, wherein the request specifies an identifier associated with the at least one data object.

26. The method of claim 24, wherein the changed at least one data object meets the interest criteria.

27. The method of claim 23, wherein the change is made by another computational entity.

28. The method of claim 27, wherein the another computational entity registered an interest in the at least one data object.

29. A method for registering an interest in at least one data object, the method performed by an application component comprising:
    determining an interest in at least one data object;
    obtaining an interest object;
    specifying interest criteria for the interest object; and
    registering the application component as an observer in the interest object such that the application component receives notifications of a change in the at least one data object.

30. The method of claim 29, further comprising:
    determining whether the interest object is a sub-interest object of an existing interest object;
    registering the interest object as a sub-interest object of the existing interest object.

31. The method of claim 29, further comprising:
    registering the interest object in an interest registry associated with the application component.

32. The method of claim 29, wherein the application component is associated with a client system and the method further comprises:
    registering the interest object in an interest registry associated with the client system; and
    registering the interest object in an interest registry associated with a server system as a sub-interest of the interest object in the client system interest registry.

33. A computer-readable medium including instructions for performing a method, when executed by a processor, the method comprising:
    receiving, from an interested component, a request for registering an interest in at least one data object including interest criteria associated with the at least one data object;
    determining a change in the at least one data object; and
    providing a notification of the change to the interested component and at least one other interested component that registered an interest in the at least one data object.

34. The computer-readable medium of claim 33, wherein determining a change in the at least one data object comprises:
    receiving a request to change the at least one data object from the interested component; and
    changing the at least one data object based on the change request.

35. The computer-readable medium of claim 34, wherein receiving a request to change the at least one data object comprises:
    receiving a change object created by the interested component.

36. The computer-readable medium of claim 33, wherein the interest criteria reflects predetermined data values associated with data attributes of the at least one data object.

37. The computer-readable medium of claim 33, wherein the request for registering an interest in at least one data object includes an identifier associated with the at least one data object specified by the interested component.

38. The computer-readable medium of claim 36, wherein determining a change in the at least one data object further comprises:
    determining whether the changed at least one data object meets the interest criteria.

39. The computer-readable medium of claim 38, wherein providing comprises:
    providing a notification of the change to the interested component and the at least one other interested component that registered an interest in the at least one data object based on a determination that the changed at least one data object meets the interest criteria.

40. The computer-readable medium of claim 33, wherein receiving, from an interested component, a request for registering an interest in at least one data object further comprises:
    creating an interest object associated with the at least one data object and the interested component.

41. The computer-readable medium of claim 40, wherein determining a change in the at least one data object further comprises:
    notifying the interest object of the change.

42. The computer-readable medium of claim 41, wherein notifying the interest object further comprises:
    notifying a sub-interest object registered to the interest object of the change.

43. The computer-readable medium of claim 40, wherein the interest object supports a union of interest criteria associated with each of a plurality of other interest objects that are associated with the at least one data object and the interested component.

44. The computer-readable medium of claim 43, wherein determining a change in the at least one data object further comprises:
    notifying the interest object when a notification of a change to the at least one data object is received by at least one of the plurality of other interest objects.

45. A computer-readable medium including instructions for performing a method when executed by a processor, the method performed by an interested component, comprising:
    providing, to a local computational entity, a request for registering interest in at least one data object; and
    receiving, from the local computational entity, a notification of a change to the at least one data object based on a notification of the change from a remote computation entity associated with the at least one data object.

46. The computer-readable medium of claim 45, wherein the request specifies an interest criteria associated with the at least one data object.

47. The computer-readable medium of claim 45, wherein the request specifies an identifier associated with the at least one data object.

48. The computer-readable medium of claim 46, wherein the changed at least one data object meets the interest criteria.

49. The computer-readable medium of claim 45, wherein the change is made by another computational entity.

50. The computer-readable medium of claim 49, wherein the another computational entity registered an interest in the at least one data object.

51. A computer-readable medium including instructions for performing a method, when executed by a processor, for registering an interest in at least one data object, the method performed by an application component comprising:
    determining an interest in at least one data object;
    obtaining an interest object;
    specifying interest criteria for the interest object; and
    registering the application component as an observer in the interest object such that the application component receives notifications of a change in the at least one data object.

52. The computer-readable medium of claim 51, further comprising:

determining whether the interest object is a sub-interest object of an existing interest object;

registering the interest object as a sub-interest object of the existing interest object.

53. The computer-readable medium of claim 51, further comprising:

registering the interest object in an interest registry associated with the application component.

54. The computer-readable medium of claim 51, wherein the application component is associated with a client system and the method further comprises:

registering the interest object in an interest registry associated with the client system; and registering the interest object in an interest registry associated with a server system as a sub-interest of the interest object in the client system interest registry.

55. A system comprising:

a client including an interested component that has an interest in a data object stored in a database and a client update management component including a registry containing a client interest object reflecting the interest; and a server including a server update management component including a server registry containing a server interest object corresponding to the client interest object that receives a notification of a change to the data object, wherein the server update management component provides a notification of a change to the data object to the client interest object and the client update management component provides the notification to the interested component.

56. A system for registering an interest in at least one data object, comprising:

means for determining an interest in at least one data object;

means for obtaining an interest object;

means for specifying interest criteria for the interest object; and means for registering the application component as an observer in the interest object such that the application component receives notifications of a change in the at least one data object.

57. A system comprising:

a client including an interested component that has interest in a data object stored in a database and a client update management component including a registry containing a client interest object reflecting the interest; and a server including a server update management component including a server registry containing a server interest object corresponding to the client interest object that receives a notification of a change to the data object, wherein the server update management component provides a notification of a change to the data object to the client interest object and the client update management component provides the notification to the interested component.

58. A method for receiving a notification of a change to an object, comprising:

registering an interest in a data object with a local update management component and a remote update management component of a remote server; and receiving a notification of an activity associated with the data object from the local update management component based on a notification received from the remote update management component and a determination that the activity meets interest criteria associated with the data object.

59. The method of claim 58, wherein the interest criteria is specified for an interest object included in an interest registry of the local update management component.

60. The method of claim 59, wherein the activity reflects a manipulation of data within the data object and the determination is based on one of whether the manipulated data is equal to a selected value and whether the manipulated data includes data values within a selected range of data values.

* * * * *